United States Patent [19]

Rieger

[11] Patent Number: 4,479,400
[45] Date of Patent: Oct. 30, 1984

[54] RACK AND PINION STEERING GEAR, ESPECIALLY FOR MOTOR VEHICLES

[75] Inventor: Wolfgang Rieger, Donzdorf, Fed. Rep. of Germany

[73] Assignee: Zahnradfabrik Friedrichshafen, AG., Friedrichshafen, Fed. Rep. of Germany

[21] Appl. No.: 367,881

[22] Filed: Apr. 13, 1982

[30] Foreign Application Priority Data

May 8, 1981 [DE] Fed. Rep. of Germany ....... 3118254

[51] Int. Cl.³ .......................... B62D 3/12; B62D 5/10
[52] U.S. Cl. ........................................ 74/422; 74/498; 92/85 R; 180/148; 267/140
[58] Field of Search ...................... 74/422, 498, 89.17; 92/85, 136; 180/147, 148; 267/140, 153

[56] References Cited

U.S. PATENT DOCUMENTS

| | | | |
|---|---|---|---|
| 2,193,898 | 3/1940 | Carter et al. | 180/148 |
| 3,143,933 | 8/1964 | Norton | 92/85 R |
| 4,187,736 | 2/1980 | Haegele | 74/422 |
| 4,281,588 | 8/1981 | Jaske | 92/136 X |

FOREIGN PATENT DOCUMENTS

| | | |
|---|---|---|
| 2415236 | 10/1975 | Fed. Rep. of Germany . |
| 927099 | 5/1963 | United Kingdom . |
| 971490 | 9/1964 | United Kingdom .................. 74/498 |
| 1054375 | 1/1967 | United Kingdom .................. 74/498 |

*Primary Examiner*—Allan D. Herrmann
*Attorney, Agent, or Firm*—Zalkind & Shuster

[57] ABSTRACT

An impact damping or cushioning means is provided to overcome the noise occasioned when a reciprocating slide block member, to which steering rods are secured, is limited in motion by engaging the ends of a housing slot in which the member slides. Such slide block is secured to a drive rod in the housing, which may be a pinion driven rack or operated by a pressure piston, and protrudes through the slot for connection to steering rods. The construction effects a damped or cushioned initial impact engagement of increasing resilient resistance up to the point of metallic non-yielding engagement of either end of the slide block with the respective end of the slot. Thus, the cushioning means at each end of the travel is of deforming, compressible rubber-like plastic material compressed in comfinement during initial impact in a recess which may be in the slide block or in the housing slot edge. Such cushioning means is shaped so that initially only a small portion is compressed as an end of the slide block approaches the respective slot end, followed by compression of the main mass prior to metallic impact.

7 Claims, 7 Drawing Figures

RACK AND PINION STEERING GEAR, ESPECIALLY FOR MOTOR VEHICLES

STATUS OF THE PRIOR ART

German OS No. 24 15 236 shows a steering mechanism wherein two bolts pass through a slide block to secure the slide block and a pair of steering rods to a steering drive member, such as a gear rack, within a housing. The housing has a slot through the wall thereof in which the slide block is guided for movement reciprocally between the ends of the slot. The arrangement precludes twisting of the gear rack as well as the steering rods by virtue of the guiding movement longitudinally of the housing, the slide block being guided by the edges of the slot. The arrangement is completed by a reinforcing plate at the outer ends of the bolts thereby forming a box joint of suitable rigidity. In such construction, the motion limiting engagement of the slide block with the ends of the slot is effected by a hard impact occasioning undesirable noise, particularly due to the metallic clash between the slide block and the slot ends. Although slide blocks have been made of rigid and hard plastic material in order to have sufficient structural strength, such materials do not effect low noise at the time of impact.

British patent No. 927,099 is likewise a rack steering gear having a flexible corrugated boot completely encircling the tie rod bolts and having a midsection secured thereto. Thus, the boot has a corrugated section at each end of the area where the tie rod bolts connect through a housing slot to the gear rack. During a full steering movement of the gear rack, the corrugations are compressed at respective ends depending on direction of steering for the purpose of damping the final movement of the gear rack, thus providing a cushioning effect. However, the material from which such corrugated compressible and expandable boots are made cannot withstand the degree of deformation required, and are thus destroyed during the couse of operation. Reinforcements are made by metallic or non-metallic stiffening collars provided where the bolts pass through the boot.

BRIEF DESCRIPTION OF THE PRESENT INVENTION

The present invention utilizes a means of damping and cushioning at the end of travel of a steering rack to eliminate the usual noises occuring by metallic impact due to motion-limiting abutment. The construction provides a satisfactory stability in operation and prevents overloading of the novel elements. Further, the construction is inherently synchronizable in damping action with the steering gear for extreme limits of steering in either direction.

More specifically, a slide block is provided guided within a longitudinal slot of a housing wall but wherein shock energy at the ends of motion of the slide block is taken up over a predetermined terminating path in several stages of deformation of a deformable member of compressible rubber-like plastic which can be compressed and resume its original configuration upon decompression. Such cushioning and damping members are so arranged that initially at the end of a steering stroke of the slide block there is a relatively small cushioning effect, initially, by partial contact of the damping members engaging the respective ends of the slot. Subsequently, the damping effect is increased by the full body of the damping members being compressed. This initial damping of only a portion of the damping members avoids of the conduction of sound therethrough. The final full compression of the damping members is effected by compressing the damping members into respective recesses in the slide block ends. Thus, ultimately there is metallic contact between the slide block ends with respective ends of the guide slot, but due to the gradual slowing up effected by the compressible members, such metallic contact is of little noise consequence.

The invention thus avoids any deformation of damping members beyond that which the material of such members can be harmed by deformation. Further, the damping members are of very simple configuration in the uncompressed condition. For example, they may be block-shaped and carried loosely in respective recesses at the ends of the slide block. The invention is readily and economically mass-produced, and the damping elements are readily interchangeable to be commensurate with particular steering applications.

DESCRIPTION OF THE INVENTION

A detailed description of the invention now follows, in conjunction with the appended drawing, in which.

Figure 1:
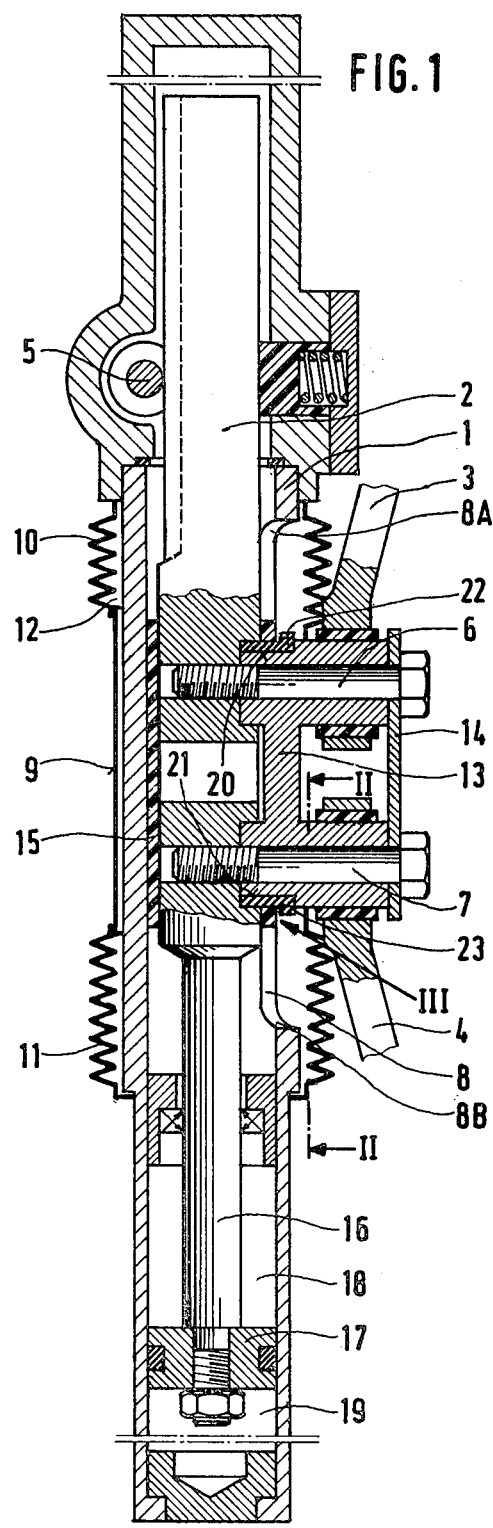
FIG. 1 is a longitudinal section through a steering mechanism of the rack steering type.
Figure 2:
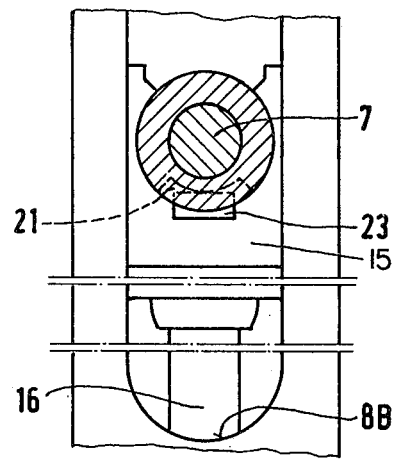
FIG. 2 is an enlarged fragmentary partial section on the section line II—II of FIG. 1.

Referring now to FIG. 1, a gear rack 2 is shown axially shiftable in a steering housing 1 to transmit movement to a pair of steering rods 3 and 4 which will be understood to connect to steering linkages of vehicle wheels, in the usual manner. Thus, the steering rack is a drive member for the steering rods and the rack in turn may be driven by a pinion 5 understood to be actuated by a steering spindle, not shown. Connections for the steering rods to the gear rack 2 are by way of respective bolts 6 and 7 which project outwardly through a guide slot 8 in the wall of housing 1. The guide slot has rounded ends, 8A and 8B, as shown particularly in FIG. 2. The housing is protected by a flexible, corrugated boot 9 which expands and contracts with movement of bolt 6 and 7 by way of the corrugated sections 10 and 11, thereby affording a spacing 12 around the housing which is sealed. Within such space 12, bolts 6 and 7 pass through collars integral with a slide block 13 for connection to a gear rack. In the description that follows, such collars will be considered for simplicity of description as a part of the slide block 13 and which slide block is longitudinally guided for movement by the edges of the guide slot 8. Construction thus prevents any twisting of the gear rack relative the housing. The ends of the guide slot, 8A and 8B, serve as motion-limiting abutments in respective directions of travel of the slide block 13, and thus as force-limiting members for the rack 2.

In the construction as shown, a metal plate 14 through which the bolts pass completes a box-like structure by bridging the bolts exteriorily of the space 12. This provides a very strong and rigid construction for what has been known as a center-driven steering mechanism. The rack is supported at its center section by the bushing 15 as a bearing sleeve.

The rack is extended to have a piston rod 16 having a piston 17 for hydraulic operation, if need be, under valve control for pressure oil into either of the chambers 18 and 19.

Figure 3:
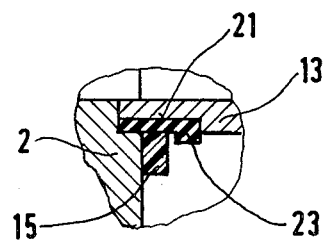
FIG. 3 shows an enlarged detail as indicated by an arrow III, as seen on FIG. 1.
Figure 4:
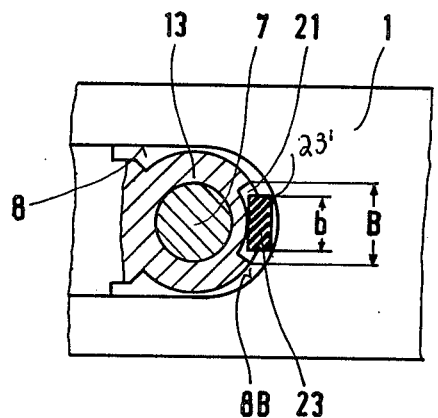
FIG. 4 shows the initial impact of a damping member carried in a recess at the end of a slide block, the corners of the block-like damping member engaging the rounded surface of the guide slot end.

Each end of the slide block is provided with a respective recess 20 and 21 at the rounded front surfaces which will be understood to be the collars for the bolts 6 and 7 and around which the steering rods 3 and 4 are secured. Each recess has a respective damping member, thus the damping member 22 is fitted into recess 20 and the damping member 23 is fitted into recess 21. These damping or cushioning members are of suitable compressible plastic material and will be seen to be simple L-shaped members from FIG. 1, having a thickened portion as seen in FIG. 4 engageable with the rounded end of guide slot 8 at 8B. It should be particularly noted that the transverse dimension of the damping member is less than the recess 21. The recess as seen in FIG. 4 is arcuate in shape and as noted in FIG. 1 extends to the end of the bolt collars and within the gear rack material, so that the support portion of the damping member is secured between the recess wall and the socket into which the collar protrudes into the gear rack, all as clearly seen in FIG. 1. Thus, the damping members are securely held against radial displacement in that manner. Further, the damping members are secured against axial displacement by the bearing sleeve 15 understood to be slotted to encompass the damping members, as will be noted from FIG. 1 in comparison with the enlarged, fragmentary view of FIG. 3.

Referring now to FIG. 4, the slide block 13 has just reached the end of travel and the corners of the block-like damping member, for example, at 23', are just engaging the rounded end 8B of the guide slot 8. It will be noted that the transverse dimension "b" is smaller than the circumferential width B of the arcuate recess 21. At this time, the damping member corners compress to initially cushion the moving force or momentum of the slide block as well as the gear rack.

Figure 5:
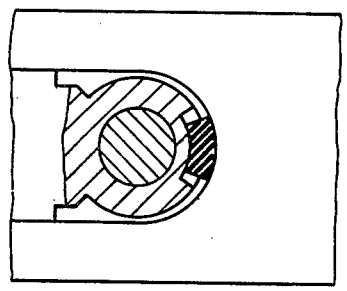
FIG. 5 illustrates full contact and compressing of the damping member with further movement of the slide block toward the slot end.

Upon further movement, and as seen in FIG. 5, the front side of the damping member has been compressibly rounded to conform to the rounding of the end surface of the guide slot. At this time, a further cushioning is effected by such compressive action.

Figure 6:
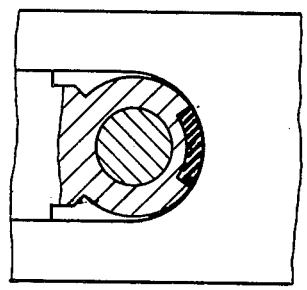
FIG. 6 shows full compression of a damping member into a recess wherein metallic impact of the slide block ultimately occurs at the rounded end of the guide slot.

Finally, as seen in FIG. 6, the entire body of the damping members, that is the lip portion extending outwardly of the arcuate recess, has been fully compressed into the recess. Thus, increased cushioning resistance has been effected to the maximum extent, and at this point the slide block has metallic engagement with the conformingly rounded end of the guide slot.

The functioning of the increasing motion damping effect as described above prevents development of any disturbing impact noises, particularly since sound conducted through slots is not introduced holohedrally into housing 1. The gradually increased damping effect by way of elastic bending the compression of the damping members up to full fit in a respective recess, as described above, thus protects the material of the damping members from being destroyed, since full damping occurs during the elastic compression up to the point where members are fully housed within their respective recesses and the exterior of the damping members is flush with the exterior surface of the slide block at which time metallic contact of the slide block with the end of the guide slot stops all motion.

Figure 7:
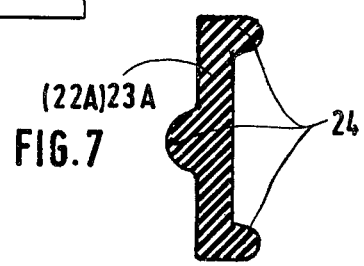
FIG. 7 shows a modified damping member to an enlarged scale.

FIG. 7 shows another embodiment of the invention by way of damping members, such as 22A, 23A, made as a plastic injection molding with projecting contact ribs 24 which initially compressed toward termination of movement of the slide block and thus act in the manner of the corners 23' of FIG. 4.

The damping arrangement hereinabove described may be synchronized with a particular steering gear as to the force occurring during steering and which force must be cushioned at the termination of a steering operation. Thus, depending on the size and shape of recesses such as 20 and 21 as well as on the particular type of damping or cushioning block material used, different characteristics of damping as desired or required may be selected.

Recesses may be suitably designed, as will be understood, to accommodate damping members such as 22 and 23, or 22A and 23A at the rounded end surfaces 8A and 8B of the guide slot 8, and thus the invention is not limited to constructions wherein damping members are necessarily carried by the slide block 13.

What is claimed is:

1. In a steering mechanism comprising a housing (1) and a steering drive member (2) therein having reciprocal travel for actuating steering rods wherein said housing has a slot (8) therethrough for a slide block (13) slidable therein and secured to said drive member for movement thereby to drive steering rods (3, 4) and having end surfaces which approach respective end surfaces (8A, 8B) of said slot during driving movement of said slide block wherein said slot end surfaces serve as motion limiting stops for said slide block;

the improvement comprising:
a respective cushioning means (22, 23) carried on the end surfaces of said slide block and engageable with the respective end surfaces of said slot at the end of travel of said slide block in a respective direction.

2. In a steering mechanism as set forth in claim 1, wherein each cushioning means has an extending formation (23', 24) to initially be compressed between an end surface of such slide block and the respective end surface of said slot followed by compression of the remainder of said cushioning means.

3. In a steering mechanism as set forth in claim 2, including respective surface recesses (21, 22) to accommodate compresed respective cushioning means forced thereinto in confinement under compression.

4. In a steering mechanism as set forth in claim 3, said respective surface recesses having an open volume sufficient to fully accommodate the respective compressive cushioning means wherein final limit of motion of said slide block is effected by engagement thereof with the respective end of said slot.

5. In a steering mechanism as set forth in claim 2, wherein said end surfaces of said slot are rounded and said extending formations (23', 24) are corners of said cushioning means disposed to initially engage the respective rounded end surfaces of the slot.

6. In a steering mechanism as set forth in claim 5, wherein said recesses (21, 22) are carried by said slide (13) and have at least one dimension (B) exceeding the corresponding dimension (b) of the respective cushioning means.

7. In a steering mechanism as set forth in claim 6, wherein the end surfaces of said slide block are rounded and said recesses are in said respective rounded end surfaces of said slide block and are circumferentially larger than the transverse width of respective cushioning means;

said recesses having rounded bottom surfaces and said cushioning means comprising flat surfaces initially tangential to the rounded bottom surfaces of respective recesses.

* * * * *